Patented Apr. 16, 1935

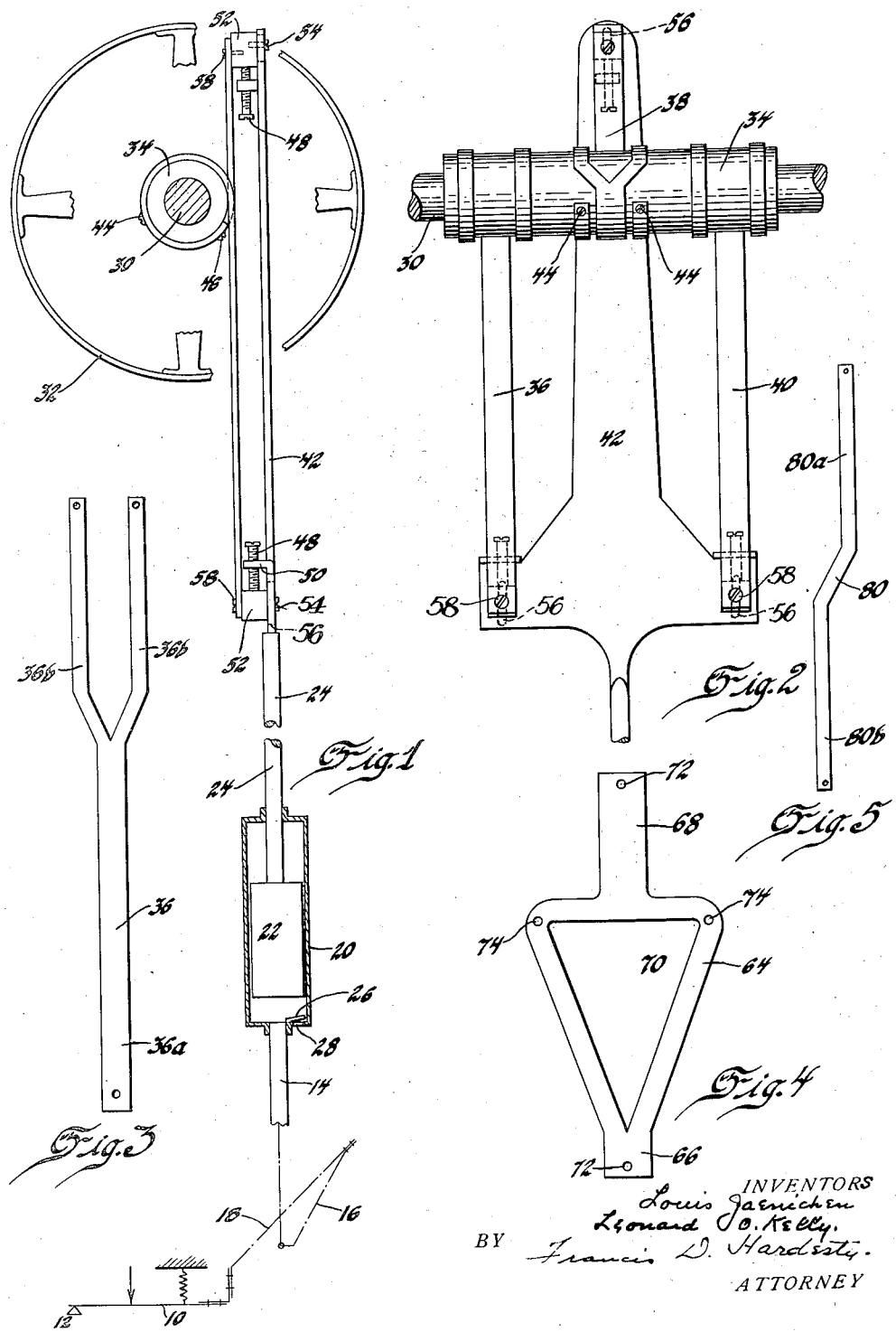

1,998,136

UNITED STATES PATENT OFFICE 1,998,136

SCALE

Louis Jaenichen, Springfield Township, Oakland County, and Leonard O. Kelley, Detroit, Mich., assignors to The Standard Computing Scale Company, Detroit, Mich., a corporation of Michigan Application February 19, 1931, Serial No. 516,999

12 Claims. (Cl. 74—95)

This invention relates to weighing mechanisms or scales, and more particularly to the provision of improved means in such mechanisms for establishing operative connection between a weighing part and a weight indicating part.

Scales which embody the invention each include weighing mechanism and a horizontally disposed rotatably mounted shaft upon which indicating means, such as a needle, dial, drum chart, or the like is mounted, there being generally provided a vertically disposed rod for establishing an operative connection between the weighing mechanism and the rotatably mounted indicating shaft. The lower end of the rod is generally connected to the weighing mechanism by a thermal control device and the upper end of the rod makes driving connection with the shaft to operate the indicating means.

It has heretofore been the practice to furnish the driving connection between the rod and shaft by rack and pinion means such as that illustrated in my copending application Ser. No. 496,450, filed November 18, 1930, such rack and pinion connections being well known to the industry.

Rack and pinion connections at this point have proven undesirable, and for years the industry has attempted to provide a frictionless, wraparound ribbon type connection between the vertically disposed rod and the horizontally disposed indicating shaft. Ribbon connections of various forms have been tried, but all of them have proven unsatisfactory, for various reasons, among which may be mentioned the following:

Thin ribbons, for example, which are the most desirable type, since they flex readily without friction, if used without strain relieving devices, are apt to break upon sudden application of the load to the platform or other load receiving portion, the power required to drive the indicating means being usually transmitted directly through these ribbons from the weighing parts to the indicating parts. Accordingly, an object of this invention is the provision of a ribbon type connection at this point in a weighing mechanism but so designed that strain upon the ribbon means due to the sudden application of load will be eliminated.

Further, ribbon connections have been used wherein but two ribbons were provided, one projecting upwardly and the other downwardly. When two ribbons only are used, however, the rod in its downward movement will pull upon only one of them, and will therefore tend to cock the indicating shaft upon its bearings, thus creating unnecessary friction on these. In other words, a two-ribbon construction tends to throw the shaft out of line and thus soon impairs the accuracy of the scale.

It had previously been contemplated, in order to overcome the misaligning defect above outlined, to provide two ribbons extending downwardly from the indicator shaft on opposite sides of the vertical axis of the rod, the ends of the ribbons being secured to the rod, and the shaft return mechanism including a spring arranged to rotate the indicator shaft reversely to the direction rotation imparted thereto by the ribbons upon loading the scale, and thus return the shaft to its zero position. This construction has also proven faulty, since a spring used for this purpose whips the shaft around on the return stroke too violently and soon ruins the accurate and delicate construction of the indicating means.

Accordingly, the construction of the present invention, incorporates three ribbons, one of which is opposed to the other two, and so arranged that misalignment and whipping are completely eliminated. Two downwardly extending ribbons act upon the indicator shaft in such manner that the force transmitted thru one tends to neutralize the tendency of the force transmitted thru the other to misalign the shaft. Further, no spring is used to rotate the rod reversely faster than the lower ribbons can move, and accordingly there is no tendency of the lower ribbons to fly off the pinion or collar, or return to any but their exact previous position.

Further, the construction of the present invention employs forked or offset ribbons, that is to say, ribbons in the shape of an elongated Y having its branches parallel. Such ribbons are so arranged that when wrapped around the shaft the leg of the Y locates itself between the branches and accordingly does not lap or interfere with the latter as the ribbon wraps upon or unwraps from the shaft.

It will be understood, however, that other forms of ribbons employing offsets may be utilized with similar results and the purport of the present invention includes ribbons so constructed.

Further, instead of using three separate ribbons disposed as outlined above, it is possible to use a single ribbon having portions so turned in upon themselves as to present two arms which project from one side of the shaft and a third arm, between the previously mentioned, two, projecting in a direction opposite to that in which the two arms project.

A further object is a ribbon connection of the type defined above wherein the ends of the ribbons are connected to the rod by adjustable connecting means permitting regulation of the length and tension of the ribbons.

A still further object is a scale having such a wrap-around ribbon connection in conjunction with a vertical driving rod having two relatively movable portions, the lower one of which is connected to a weighing part and the upper one of which is connected to the ribbons, the coupling between the adjacent ends of the rod portions being such that such portions may slide with respect to each other to provide means for relieving undue or sudden strain upon the ribbons.

It is further contemplated to incorporate in such a coupling dashpot means adapted to smooth the action of the indicating means and prevent fluttering of the same.

Still further objects will readily occur to those skilled in the art upon reference to the following description and the accompanying drawing in which Fig. 1 is a somewhat diagrammatic view of scale parts embodying the invention, partly in section and partly in side elevation.

Fig. 2 is a view showing in greater detail the connection between the rotatably mounted shaft and the slidable rod, looking in a direction at right angles to Figure 1.

Fig. 3 is a plan view of one of the ribbons; and

Figs. 4 and 5 are similar plan views of modified forms of ribbons.

Referring to the drawing, it will be seen that there is shown, diagrammatically, weighing mechanism including a main lever 10, fulcrumed at 12 and pivotally connected to the bottom portion 14 of the connecting rod, by a thermostatic bar 16 and a link 18. This connection may be similar to that disclosed in my copending application Ser. No. 496,450. Load counterbalancing means is provided, designated S, and a load is represented by the arrow L.

The lower portion 14 of the rod terminates at its upper end in a cylindrical casing 20 in which reciprocates the piston 22 secured to the lower extremity of the upper rod section 24 of the rod. The piston need not fit the cylinder tightly and serves in addition as a weight tending to draw the upper rod section downwardly and so move the indicating means (in a manner presently to be described) when the lower rod section and the bottom of the cylinder are moved downwardly and from beneath it under the influence of a load upon the scale. The casing 20 is provided with a valve 26 loosely controlling the opening 28 in the casing and arranged to open upon sufficiently rapid downward movement of the cylinder, to free it relatively to the piston and connected upper rod section. This form of connection between the connecting rod parts permits the lower portion 14 to move rapidly in response to a sudden application of the load L to the lever 10, while at the same time the upper portion can move slowly and without load or strain being imparted to it, and to parts to which it is connected. Further, this form of connection between the rod portions, provides a dash pot action for the indicating parts connected to the rod portion 24, and prevents fluttering or too rapid movement of these parts.

The upper portion 24 of the rod is operatively connected to a horizontally disposed, rotatably mounted shaft 30 by means forming part of the present invention and hereinafter described, so as to rotate the shaft in its bearings, in response to the effect of the load, and the shaft carries indicating means, such as the drum chart 32, which rotates with it, to furnish means by which the effect of the load may be made visible.

The operative connection between the rod portion 24 and the indicator shaft 30 includes an elongated collar or sleeve 34 fixed to the shaft 30 and a plurality of ribbons 36—38—40. The ribbons 36 and 40 are on the outer ends of the collar and the ribbon 38 is disposed between them, in line with the axis of the vertical rod portion 24. The ribbons are of elongated Y shape, as is best shown in Fig. 3, and the leg portions of ribbons 36 and 40 being secured at their lower extremities to opposite ends of a plate 42 carried by the top of the rod section 24, while the branches of these Y-shaped ribbons are secured to and ordinarily wrapped around the collar 34, being fastened by any suitable means, such as the screws 46. The central ribbon 38 is wrapped around the sleeve 34 in the opposite direction, and its leg portion extends upwardly therefrom, being connected to the upper end of plate 42, while the branch portions thereof are similarly secured to the sleeves or collar, as by screws 44.

The means for securing the leg portions of the ribbons to the plate 42 include adjusting screws 48 threaded through lugs 50 bent from the plate 42 the screws engaging at their ends the blocks 52 secured to the plate by screws 54 passed thru slots 56, to permit vertical sliding of the blocks when screws 54 are loosened. The ends of the ribbons are secured to the blocks 52 by screws 58, as shown. Other adjusting means may of course be used if desired, this specific form not being at all essential so far as the invention is concerned.

The ribbons which are preferably of thin sheet steel of the order of .002 inches thick, are wrapped around the sleeve or collar so that at least one turn of each ribbon encompasses the collar. When the rod portion 24 is moved up or down, the ribbons wrap or unwrap on the collar while moving the same and so the indicator shaft. The legs of each ribbon (36a—Fig. 3) will locate themselves between the branch portions, (36—Fig. 3) as shown, sufficient space being left to eliminate possibility of their lapping or interfering with the remainder of the ribbon.

Other forms of ribbons embodying the ideas above set forth may be provided. For example, as shown in Fig. 4, the ribbon 64 is in the form of an open triangle and has two parts 66 and 68, projecting from the apex and base respectively. The part 66 is turned into the space 70 and then downwardly again, the collar on the shaft being encompassed in the turn of part 66, the whole resembling a bow string. The parts are secured to spaced parts of a plate more or less like the plate 42, by means passing thru the perforations 72, and the ribbon is secured to the collar to prevent slipping by means passing thru the perforations 74.

It will be observed that this form of ribbon includes three operating portions, all joined in one integral unit, and the claims, even tho limited, to a three ribbon construction, are to be construed with ribbons of this character in mind.

Another form of ribbon shown in Fig. 5 somewhat resembles the one of Fig. 3, differing therefrom in that one of the branches is omitted. The parts 80a and 80b of the ribbon 80 are offset from each other and in wrapping, one part wraps clear of the other part, as will be readily understood.

Concluding, it will be seen that there has been provided a wrap-around ribbon indicator driving construction for weighing scales so designed that breakage of ribbons, misaligning of parts and dissimilar or uneven indicator actuations are eliminated.

Now having described the invention and the preferred embodiment thereof, it is to be understood that the said invention is to be limited, however, not to the specific details herein set forth, but only by the scope of the claims which follow.

What we claim is:—

1. Motion transmitting means for a weighing scale, comprising a shaft, a reciprocable rod having a portion connected to oscillate said shaft, the rod-shaft connecting including a plurality of ribbons secured to and encircling said shaft and having their free ends projecting from the shaft and connected to said rod on opposite sides of the shaft, there being at least three ribbons, disposed side by side on the shaft, the outer ribbons projecting from the shaft in a direction opposite to that in which the center ribbon projects from the shaft, the center ribbon being in alignment with the rod.

2. Motion transmitting means for weighing scales and the like including a rotatably mounted shaft and a reciprocable rod formed in two relatively movable sections, one section being connected to said shaft to rotate the same upon longitudinal movement of the rod, and the other section being connected to driving means, and yieldable coupling means between the rod sections which permits relative sliding movement of such sections, including a dashpot forming a casing carried by the end of one section and a piston carried by the adjacent end of the other section and slidable in the casing.

3. Motion transmitting means for weighing scales and the like including a rotatably mounted driven shaft, a reciprocable rod formed in relatively movable driving and driven sections, the driven section being connected to said shaft to rotate the same upon longitudinal movement of the rod, coupling means between the driving and driven rod sections which permits relatively sliding movement of said sections, the coupling means including a dashpot comprising a casing member carried by one of said sections and a piston member carried by the other section and slidable in the casing, one of said members serving as a weight tending to move the rod section by which it is carried.

4. Motion converting and transmitting means for weighing scales and the like including a rotatably mounted shaft, a reciprocable rod formed in relatively movable sections, one connected to said shaft, such rod-shaft connection including a plurality of ribbons secured to and encircling said shaft and having their free ends projecting therefrom and connected to said rod section on opposite sides of the shaft, and coupling means between said last mentioned rod section and the other rod section which permits relative sliding movement of the sections, there being at least three ribbons disposed side by side on the shaft, the two outer ribbons projecting from the shaft in a direction opposite to that in which the center ribbon projects from the shaft, the center ribbon being in alignment with the rod.

5. Motion converting and transmitting means for weighing scales and the like including a rotatably mounted shaft, a reciprocable rod formed in relatively movable sections, one section being connected to said shaft, the rod-shaft connection including a plurality of thin ribbons secured to and encircling said shaft and having their free ends projecting therefrom and connected to said rod section on opposite sides of the shaft, and yieldable coupling means between the rod sections which permits relative sliding movement of the sections, including a dashpot comprising a casing member carried by one of the sections and a piston member carried by the other section and slidable in the casing, one of said members serving as a weight tending to move the section by which it is carried, there being at least three ribbons disposed side by side on the shaft, the two outer ribbons projecting from the shaft in a direction opposite to that in which the center ribbon projects from the shaft.

6. Motion converting and transmitting means for weighing scales and the like including a rotatably mounted shaft, a reciprocable rod formed in relatively movable portions, one portion being connected to said shaft, the rod-shaft connection including a plurality of ribbons secured to and encircling said shaft and having their free ends projecting therefrom and connected to said rod on opposite sides of the shaft, each of the ribbons including two relatively offset parts, one of which is secured to the rod and the other of which is secured to the shaft, the offset being such that as the ribbon wraps around the shaft the offset parts will not lap or interfere with each other.

7. Motion converting and transmitting means for weighing scales and the like including a rotatably mounted shaft, a reciprocable rod formed in relatively movable sections, one section being connected to said shaft, the rod-shaft connection including a plurality of thin ribbons secured to and encircling said shaft and having their free ends projecting from the shaft and connected to said rod portion on opposite sides of the shaft, coupling means between the rod portions which permits relative sliding movement of the portions, including a dashpot comprising a casing member carried by one of the portions and a piston member carried by the other portion and slidable in the casing, one of said members serving as a weight tending to move the section by which it is carried, there being at least three ribbons disposed side by side on the shaft, the two outer ribbons projecting from the shaft in a direction opposite to that in which the center ribbon projects from the shaft, each of the ribbons including two relatively offset parts, one of which is secured to the rod and the other of which is secured to the shaft, the offset being such that as the ribbon is wrapped around the shaft, the offset parts will not lap or interfere with each other.

8. Motion converting and transmitting means for weighing scales and the like including a rotatably mounted shaft, a reciprocable rod formed in relatively movable sections, one section being connected to said shaft, the rod-shaft connection including a plurality of thin ribbons secured to and encircling said shaft and having their free ends projecting from the shaft and connected to said rod on opposite sides of the shaft, each of the ribbons being substantially Y-shaped, with the branches of the Y parallel and secured to the shaft and spaced from each other a distance greater than the width of the leg of the Y, the latter being secured to the rod, so that as the ribbon is wrapped around the shaft, the leg of the Y locates itself between the branches and does not lap or interfere with the latter parts.

9. Motion converting and transmitting means for weighing scales and the like including a rotatably mounted shaft, a reciprocable rod formed in relatively movable sections, one section being connected to said shaft, the rod-shaft connection including a plurality of thin ribbons secured to and encircling said shaft and having their free ends projecting from the shaft and connected to said rod section on opposite sides of the shaft, coupling means between the rod sections which permits relative sliding movement thereof, the coupling means including a dashpot comprising a casing carried by one of the sections and a piston carried by the other section and slidable in the casing, there being at least three ribbons, disposed side by side on the shaft, the two outer ribbons projecting from the shaft in a direction opposite to that in which the center ribbon projects from the shaft, each of the ribbons being substantially in the shape of a Y, with the branches of the Y parallel and secured to the shaft, and spaced from each other a distance greater than the width of the leg of the Y, the latter being secured to the rod, so that as the ribbon is wrapped around the shaft the leg of the Y will locate itself between the branches and not lap or interfere with the latter parts.

10. Motion converting and transmitting means for weighing scale and the like including a rotatably mounted shaft, a reciprocable rod formed in relatively movable sections, one section being connected to said shaft, the rod-shaft connection including a plurality of thin ribbons secured to and encircling said shaft and having their free ends projecting from the shaft and connected to said rod section on opposite sides of the shaft, means movably affixing the ends of the ribbon to said rod section, and yieldable coupling means between the rod sections.

11. Motion converting and transmitting means for weighing scales and the like including a rotatably mounted shaft, a reciprocable rod formed in relatively movable sections, one section being connected to said shaft, the rod-shaft connection including a plurality of thin ribbons secured to and encircling said shaft and having their free ends projecting from the shaft and connected to said rod section on opposite sides of the shaft, there being at least three ribbons, disposed side by side on the shaft the two outer ribbons projecting downwardly from the shaft and the center ribbon projecting upwardly from the shaft and aligned with the rod, and means yieldably coupling the rod sections.

12. Motion converting and transmitting means for weighing scales and the like including a rotatably mounted shaft, a reciprocable rod formed in relatively movable sections, one of said sections being connected to said shaft, the rod-shaft connection including a plurality of thin ribbons secured to and encircling said shaft and having their free ends projecting from the shaft and connected to said rod section on opposite sides of the shaft, there being at least three ribbons, disposed side by side on the shaft, the two outer ribbons projecting from the shaft in a direction opposite to that in which the center ribbon projects from the shaft, the center ribbon being in alignment with the rod, means movably affixing the ends of the ribbon to said rod section and yieldably coupling means between the rod sections.

LOUIS JAENICHEN.
LEONARD O. KELLEY.